United States Patent [19]

Mott

[11] Patent Number: 4,550,616
[45] Date of Patent: Nov. 5, 1985

[54] PNEUMATIC FLOW STATION

[75] Inventor: Richard C. Mott, Harwood Heights, Ill.

[73] Assignee: Honeywell Inc., Minneapolis, Minn.

[21] Appl. No.: 534,525

[22] Filed: Sep. 21, 1983

[51] Int. Cl.⁴ .............................................. G01F 1/28
[52] U.S. Cl. .................................................. 73/861.74
[58] Field of Search .......... 73/861.42, 861.71, 861.73, 73/861.74; 235/200 WB

[56] References Cited

U.S. PATENT DOCUMENTS

| | | | |
|---|---|---|---|
| 1,018,561 | 2/1912 | Hitchcock . | |
| 1,581,957 | 4/1926 | Keller . | |
| 2,408,685 | 10/1946 | Rosenberger | 73/467 |
| 2,626,626 | 1/1953 | Rosenberger | 137/85 |
| 2,672,151 | 3/1954 | Newbold | 137/86 |
| 2,963,906 | 12/1960 | Bailey | 73/205 |
| 2,986,151 | 5/1961 | Shannon | 137/85 |
| 2,992,559 | 7/1961 | Martz et al. . | |
| 3,129,587 | 4/1964 | Hallanger | 73/211 |
| 3,230,768 | 1/1966 | Johnson | 73/205 |
| 3,250,469 | 5/1966 | Colston | 235/200 |
| 3,747,406 | 7/1973 | Maurer | 73/205 R |
| 3,748,454 | 7/1973 | Grier | 235/200 WB |
| 4,008,611 | 2/1977 | Turocy | 73/205 R |
| 4,201,336 | 5/1980 | Mott | 235/200 WB |

*Primary Examiner*—Charles Hart
*Attorney, Agent, or Firm*—Charles J. Ungemach

[57] ABSTRACT

A flow velocity sensor including a target mounted in a stream so that a force which varies with the square of the fluid velocity is produced by the target and including a source of variable pressure and pressure squaring means operable to produce a rebalance force on the target. The pressure varying substantially linearly with the velocity of flow.

4 Claims, 6 Drawing Figures

4,550,616

PNEUMATIC FLOW STATION

BACKGROUND OF THE INVENTION

In many air duct systems, particularly those involving variable air volume, it is desirable to be able to measure the air flow in the duct work. A difficult problem is encountered because of the non-uniform distribution of air flow in ducts caused by wall friction, duct length, elbows, stratification, obstructions and the like so that even under laboratory conditions, the measurement of actual flow is often tedious and cumbersome.

In the prior art there have been two measurement techniques that operate reasonably well to determine the actual flow. The first of these techniques involves the pressure drop across a calibrated orifice or baffle and the output is a reasonably reliable measure of total flow. However, in order to get good readings, the pressure drop has to be fairly large because low pressure transducers are expensive and hard to work with. The large pressure drops represent loss of energy which make this method of measuring flow an expensive undertaking. While in the laboratory this may be acceptable, it is not suitable for field applications.

The second accepted measurement technique is a "Pitot tube traverse". In this technique, a single Pitot tube is sequentially positioned at various points in the duct work to obtain the velocity pressures at these points. The square root of the velocity pressures are then averaged to obtain the average velocity and consequentially the average flow. Obviously the moving of a single Pitot tube to different positions is a slow and tedious procedure that is only fit for laboratory work but the method is one which produces very little disruption of the flow and incurs a minimum pressure drop. An extension of this technique has been used by some companies who have developed "flow stations" incorporating permanently mounted arrays of Pitot tubes so as to avoid the manual positioning of a single. These systems pneumatically average the Pitot tube pressures to arrive at an average velocity pressure signal and the square root of this average is then taken which produces an output that is not as accurate as the traverse since the square root of the average is taken rather than the average of the square roots. Nevertheless, a very good approximation of the true flow is obtained with the resulting error being probably about three percent. The Pitot tube flow station has become an industry standard although it still has some problems because the flow station must be fabricated to match particular duct sizes and since the relationship between flow and velocity pressure is not linear it is necessary to use non-linear gauges or square root extractors on the output pressure causing the system to be relatively expensive.

SUMMARY OF THE PRESENT INVENTION

The present invention utilizes a different approach in a pneumatic flow station to produce a relatively low cost device that produces an output pressure which varies proportionally or linearly with the flow, additionally, with the present invention, the difference in output in a duct with a 90 degree elbow varies by only about two percent from one in which there is straight flow.

The present flow station utilizes the force that moving air produces on a target area member located in the stream. This force is in a first direction and is applied to a pneumatic force member such as a bellows or diaphragm. A sensor such as a flapper valve is utilized to sense motion of the target and to feedback a pressure to the bellows which can be varied to produce a rebalance force in opposite direction. The force on the target is a function of the square of the flow velocity and so a squaring device is located in the rebalance loop to make the rebalance pressure vary with the square of the output pressure. Thus the output pressure signal varies in a direct and substantially linear way with flow velocity.

DETAILED DESCRIPTION OF THE PREFERRED EMBODIMENTS

Figure 1:
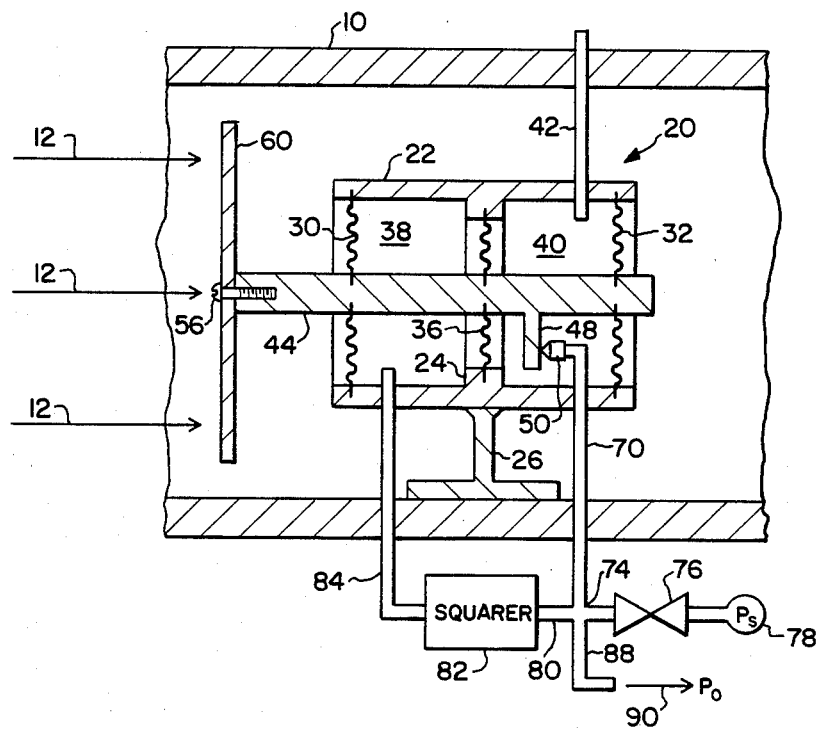
FIG. 1 is a cross-sectional view of a duct in which a preferred embodiment of the flow station of the present invention is shown.

In FIG. 1, a section of duct work 10 is shown through which a fluid such as air is flowing in a direction generally shown by arrows 12.

A pneumatic flow station of the present invention shown generally at 20 consists of a housing 22, which would generally be circular, and having an inwardly extending abutment portion 24 generally located at about the middle of the interior of the housing 22. The housing is shown mounted to the duct 10 by a member 26 which may be of any convenient form and which may be affixed to the housing and the duct 10 in any normal manner such as by sheet metal screws.

The interior of the housing 22, in the preferred embodiment, comprises a pair of bellows or diaphragm members 30 and 32 extending across the opposite ends of the housing member 22 and sealing the interior of the housing from the air flow 12. A third diaphragm, member 36, having a smaller area than members 30 and 32, extends across the interior of housing 22 at the abutment portion 24 and seals the interior of housing 22 into two chambers 38 and 40 with chamber 40 being exposed to atmospheric pressure by an open line 42.

A shaft member 44 extends longitudinally through the interior portion of housing 22 and is fastened to the central portions of the diaphragms 30, 32, and 36. Shaft 44 has an extension 48 which operates in cooperation with a nozzle 50 to form a flapper valve used in the feedback loop of the present invention which will be described hereinafter.

Affixed to the upstream end of shaft 44 by any convenient means such as a bolt 56 is a target member 60 which may take any convenient size and shape, such as a cross or x shape, in order to fit the various conditions found in the duct and also to cover different force ranges that might be encountered with different flow conditions. For example, using an x-shaped target in small ducts, the arms of the target (better seen in FIG. 2) may be short and wide while for larger ducts (better seen in FIG. 3) they might be longer and thinner. If one target will not adequately cover the area of the duct, then two or more units can be used (as seen in FIG. 4) with their outputs averaged as will be discussed hereinafter. Obviously, one target may be exchanged for another quickly and easily by removing bolt 56 and reaffixing it with a different target. Another advantage obtained by sizing or selecting the target area and shape is that the whole unit can be tailored to respond to different velocity ranges. That is, a three to thirteen PSI branch line pressure can be made to represent many velocity ranges. This means that the flow station can be tailored for a specific application and could result in a simplification of the flow station control system. As an example, it should be possible to eliminate the attenuators or ratio relays that are required in existing flow controllers and the elimination of these devices would result in lower costs, better control, and reduced application engineering.

The force on target 60 varies with the square of the velocity of the flow as will hereinafter be explained and as this force increases due to increased air flow along the direction of arrows 12, shaft 44 will move towards the right in FIG. 1. As it does so, the flapper valve consisting of extension 48 and nozzle 50 will become more closed thereby increasing the pressure in a line 70 which is connected to a pneumatic junction 74. Pneumatic junction 74 is connected through a restriction 76 to a source of supply pressure $P_s$ identified by reference numeral 78. Junction 74 is also connected by a line 80 to a squaring device 82 whose output is connected by a line 84 to the interior of chamber 38 in the flow station. Junction 74 is also connected by a line 88 to provide the output pressure $P_0$ shown by arrow 90. The apparatus including the flapper valve formed by extension 48 and nozzle 50, line 70, junction 74, restriction 76, source 78, lines 80, squaring device 82, and line 84 operate to produce a square root extraction pressure $P_0$ force in a manner like that shown in FIG. 7 of my U.S. patent which issued May 6, 1980, and is assigned to the assignee of the present invention. As explained more completely in this patent, the pressure issuing from the squaring device 82 in line 84 is proportional to the square of the pressure $P_0$ entering the squaring device 82 from line 80. Thus, the feedback to the chamber 38 which produces the rebalance force on the shaft 44 in a direction opposite to the air flow 12 varies with the square of the output pressure $P_0$ at junction 74. Because the force on target 60 varies with the square of the velocity of flow, and since the rebalance force varies with the square of the output pressure $P_0$, the output pressure $P_0$ varies linearly with the velocity of air flow in the duct 10. This can better be seen by consideration of the following analysis:

If the air flow in duct 10 has a velocity V, then the drag force $F_v$ on the target 60 will be equal to $K_1 V^2$ where $K_1$ is a constant relating to the area of the target and the drag coefficient.

The rebalance force $F_p$ opposing the drag force $F_v$ on the target 60 is equal to $P K_2(A_1 - A_2)$ where P is the pressure in chamber 38, $A_1$ is the area of diaphragm 30, $A_2$ is the area of diaphragm 32 and $K_2$ is a constant of proportionality. It should be remembered that the pressure in chamber 40 is atmospheric pressure by virtue of the open line 42.

Further, as described above and more particularly in the above-mentioned U.S. Pat. No. 4,201,336 the pressure P in chamber 38 is linearly related to the square of the pressure $P_0$ at junction 74, that is, P is equal to $K_3 P_0^2$ where $K_3$ is another constant of proportionality. Since at a rebalance position $F_P - F_V$ then $F_V$ is equal to $K_3 P_0^2 (A_1 - A_2)$.

Rearranging the last expression:

$$P_0^2 = \frac{K_1 V^2}{K_3(A_1 - A_2)}$$

and $$P_0 = V \sqrt{\frac{K_1}{K_3(A_1 - A_3)}}$$

It is thus seen that $P_0$ is linearly related with V since $K_1$, $K_3$, $A_1$ and $A_2$ are all constants.

The structure of FIG. 1 is a preferred embodiment and many obvious modifications will occur to those skilled in the art. For example, to provide an opposing rebalance force $F_P$, it is only necessary to have a single bellows receiving a pressure proportional to $P_0^2$. The use of a second chamber 40 in the preferred embodiment is primarily for mounting ease and is not absolutely necessary. Other types of pressure motive means could also be used and the specific mounting arrangements are a matter of design choice.

Figure 2:
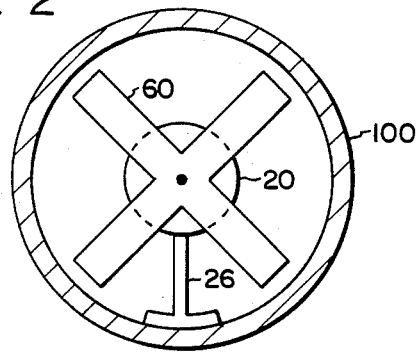
FIG. 2 is a cross-section of a circular duct showing the shape of one possible target.
Figure 3:
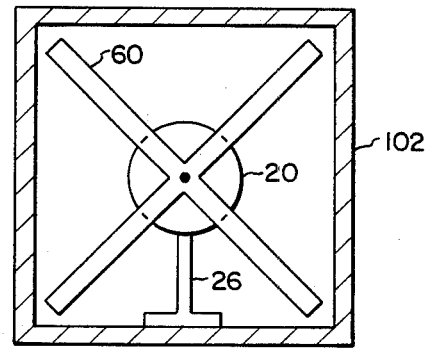
FIG. 3 is a cross-section of a square duct showing the shape of another possible target.
Figure 4:
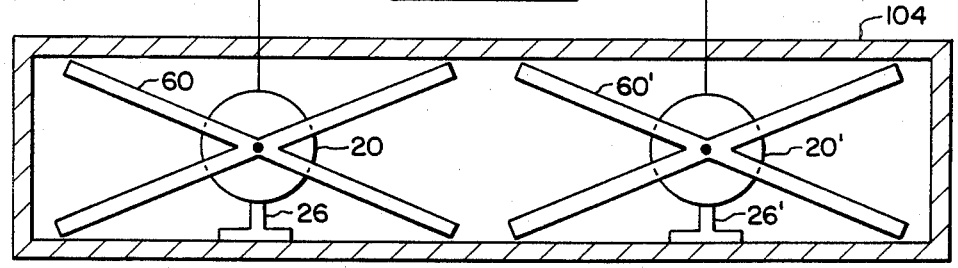
FIG. 4 is a cross-section of a rectangular duct showing a possible configuration utilizing two targets and flow stations.

In FIGS. 2, 3, and 4, the system of the present invention is shown mounted in ducts of various cross-sectional configurations. Reference numerals in these FIGURES correspond to the reference numerals used in FIG. 1. FIG. 2 shows how the target 60 might appear when mounted in a small circular duct 100. FIG. 3 shows how the target 60 might appear mounted in a larger square duct 102. FIG. 4 shows how a pair of stations 20 and 20' might be placed by mountings 26 and 26' and with targets 60 and 60' each extending only about half-way across the cross-sectional area of a elongated rectangular duct 104. In FIG. 4 the two outputs 106 and 108 of the two stations 20 and 20' each of them representing the linear variation of air flow sensed by their portions of the system are presented to an averaging relay 110 so that the output pressure $P_0$ shown by arrow 112 varies linearly with the average velocity sensed by the two stations.

Figure 5:
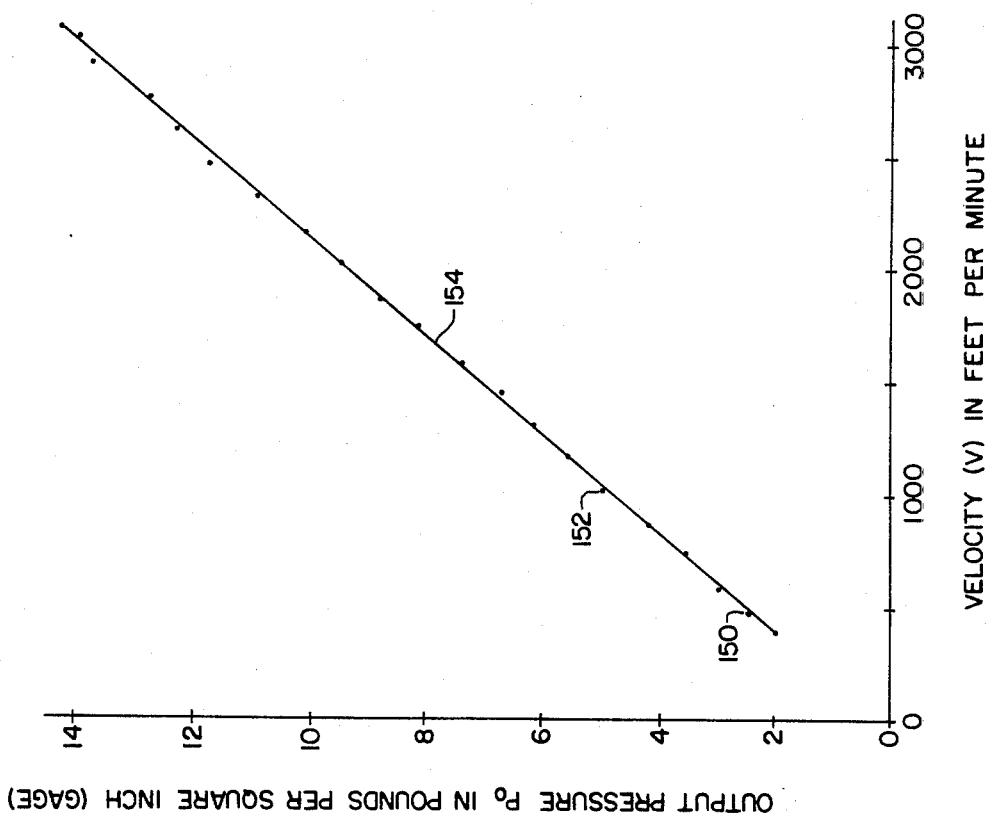
FIG. 5 is a graph showing the variation of output pressure from a flow station of the present invention with the velocity of flow in a straight duct.

FIG. 5 shows a graph indicating the variation of measurements of $P_0$ in pounds per square inch with variations in velocity V in feet per minute. The dots such as 150 and 152 indicate actual measurements whereas the straight line 154 shows how closely the actual measurements correspond to a strictly linear relationship.

Figure 6:
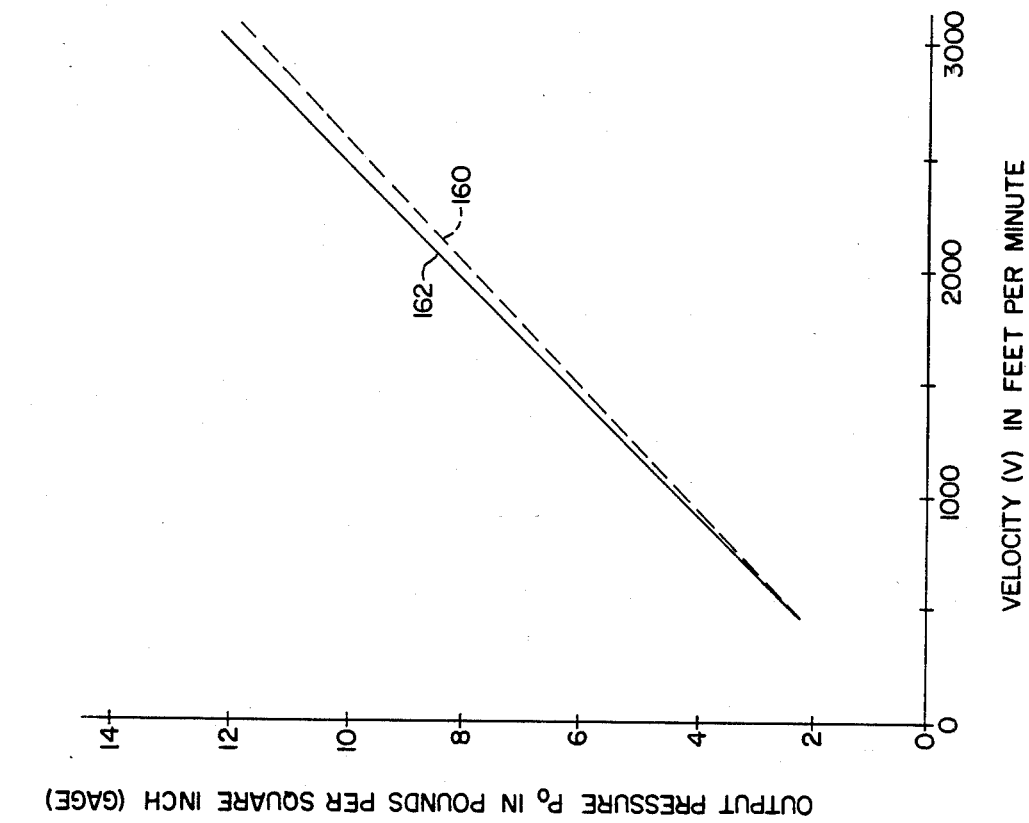
FIG. 6 is a graph showing the variation of output pressure from a flow station of the present invention with the velocity of flow in a duct having a 90 degree elbow therein.

FIG. 6 shows the variation of output pressure $P_1$ in pounds per square inch with the velocity V of the fluid in feet per minute for a duct having a circular diameter of eight inches and where the flow station was placed three duct diameters downstream from a 90 degree elbow as compared with measurements in a straight duct. The dash line 160 shows the measurement of pressures in the duct having the elbow whereas the straight line 162 shows how the variations would appear in a straight duct. It is seen from FIG. 6 that even with an elbow in the duct, the variation from actual linear measurements is small (in the neighborhood of less than two percent error).

Accordingly, it is seen that I have provided a novel pneumatic flow station in which the output varies linearly with the air velocity in the duct in which the station is placed. It is also seen that I have provided a relatively low cost and easily modified system for use in ducts of various configurations. Many variations will occur to those skilled in the art and, I do not wish to be limited to the specific disclosures used in connection with the preferred embodiment. I intend only to be limited by the following claims.

I claim:

1. A fluid flow measurement system for use in a duct comprising:
    force means positioned in the duct to receive the fluid and to produce a first force that varies with the square of the fluid velocity in the duct;
    rebalance means including a first chamber having flexible walls connected to said force means and having an input to receive a rebalance pressure which, when applied to the chamber, moves the flexible walls in a direction opposite to the direction the first force is applied, including a second chamber having flexible walls also connected to the force means, the second chamber being exposed to atmospheric pressure, and including squaring means connected to said force means to receive the first force and operable to produce a variable pressure, said squaring means operating on the variable pressure to produce the rebalance pressure which varies with the square of the variable pressure; and
    means connecting the squaring means to said first chamber to apply the rebalance force to said first chamber to produce a rebalance force opposing the first force, the variable pressure thereby varying as the square root of the first force and thus varying substantially linearly with the fluid velocity as an output indicative of flow measurement.

2. Apparatus according to claim 1 wherein said force means includes a member having a surface positioned in the duct to receive the fluid flow thereupon so that the first force varies with the square of the velocity of fluid flow, the drag coefficient of the fluid on the surface, and the area of the surface.

3. Apparatus according to claim 2 wherein the surface is in the form of a "X".

4. First and second fluid flow measurement systems, each constructed according to claim 1 and further including averaging means connected to receive the variable pressure from each system as in input, and to produce an output pressure representative of the average of the inputs.

* * * * *